Nov. 1, 1960

D. E. DRESSELHAUS 2,958,192

TURBINE JET ENGINE

Filed Sept. 19, 1958

INVENTOR.
Donald E. Dresselhaus,
BY
McMorrow, Berman + Davidson
ATTORNEYS

Nov. 1, 1960  D. E. DRESSELHAUS  2,958,192
TURBINE JET ENGINE
Filed Sept. 19, 1958  6 Sheets-Sheet 2
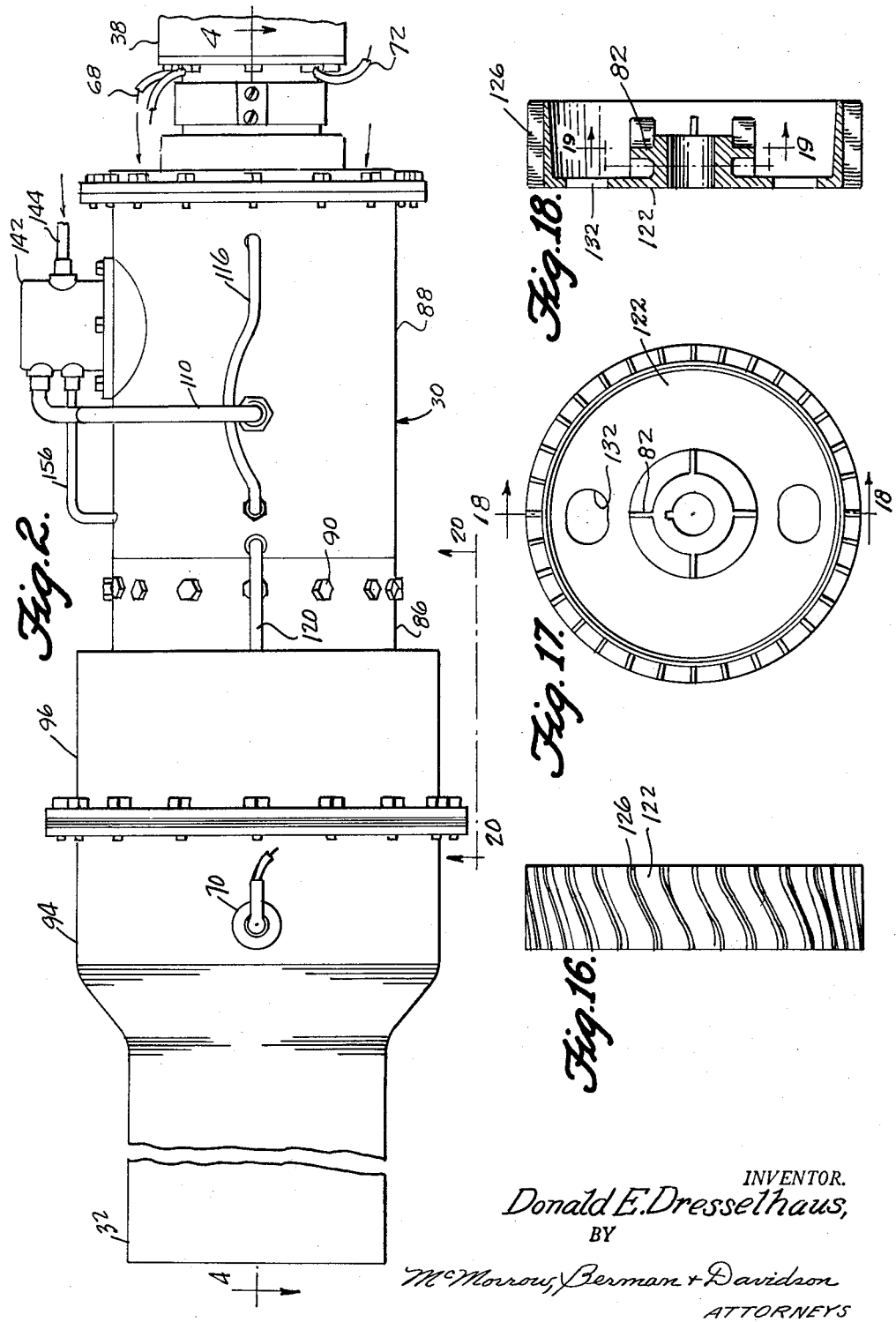
INVENTOR.
Donald E. Dresselhaus,
BY
McMorrow, Berman + Davidson
ATTORNEYS

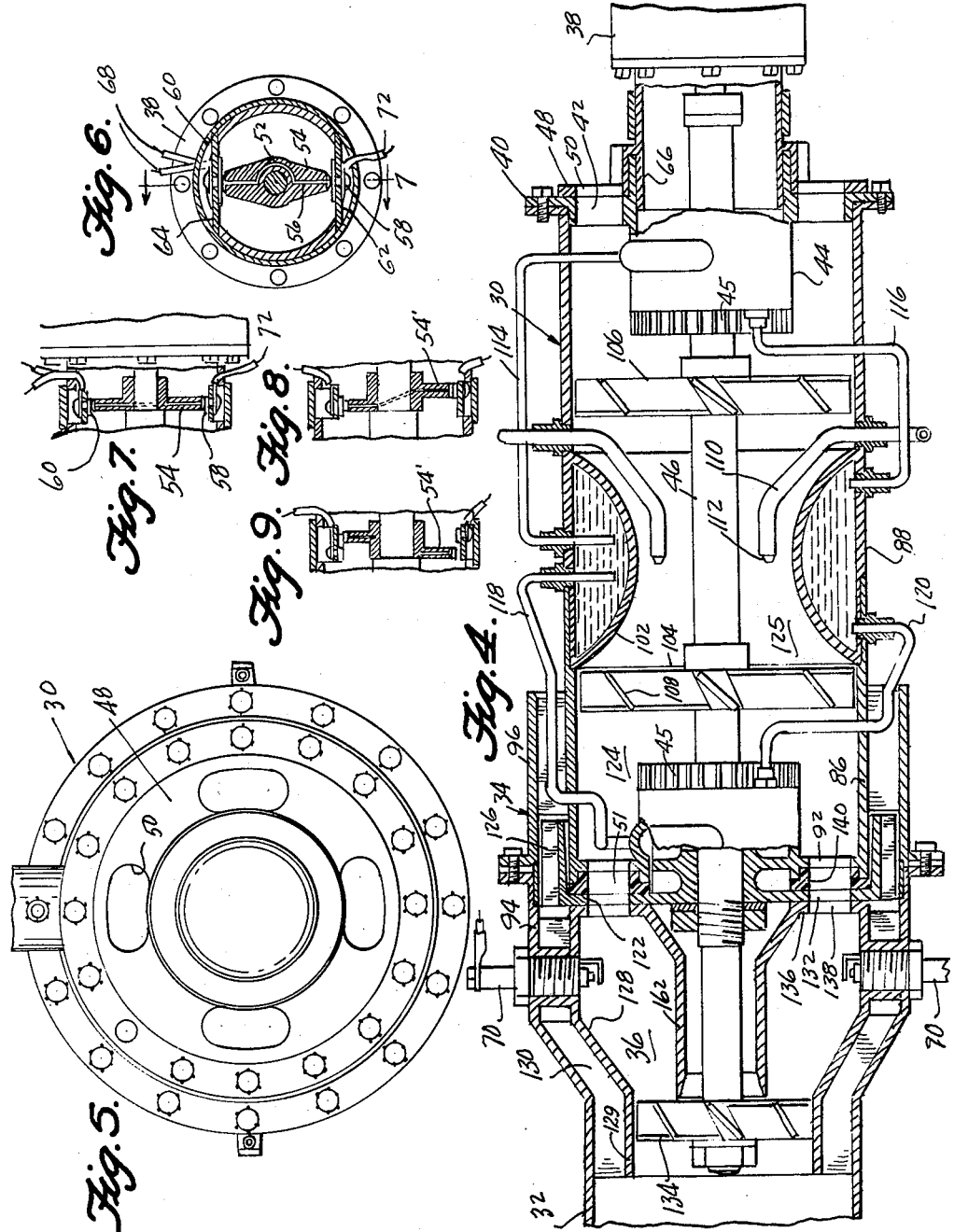

Nov. 1, 1960 D. E. DRESSELHAUS 2,958,192
TURBINE JET ENGINE
Filed Sept. 19, 1958 6 Sheets-Sheet 4
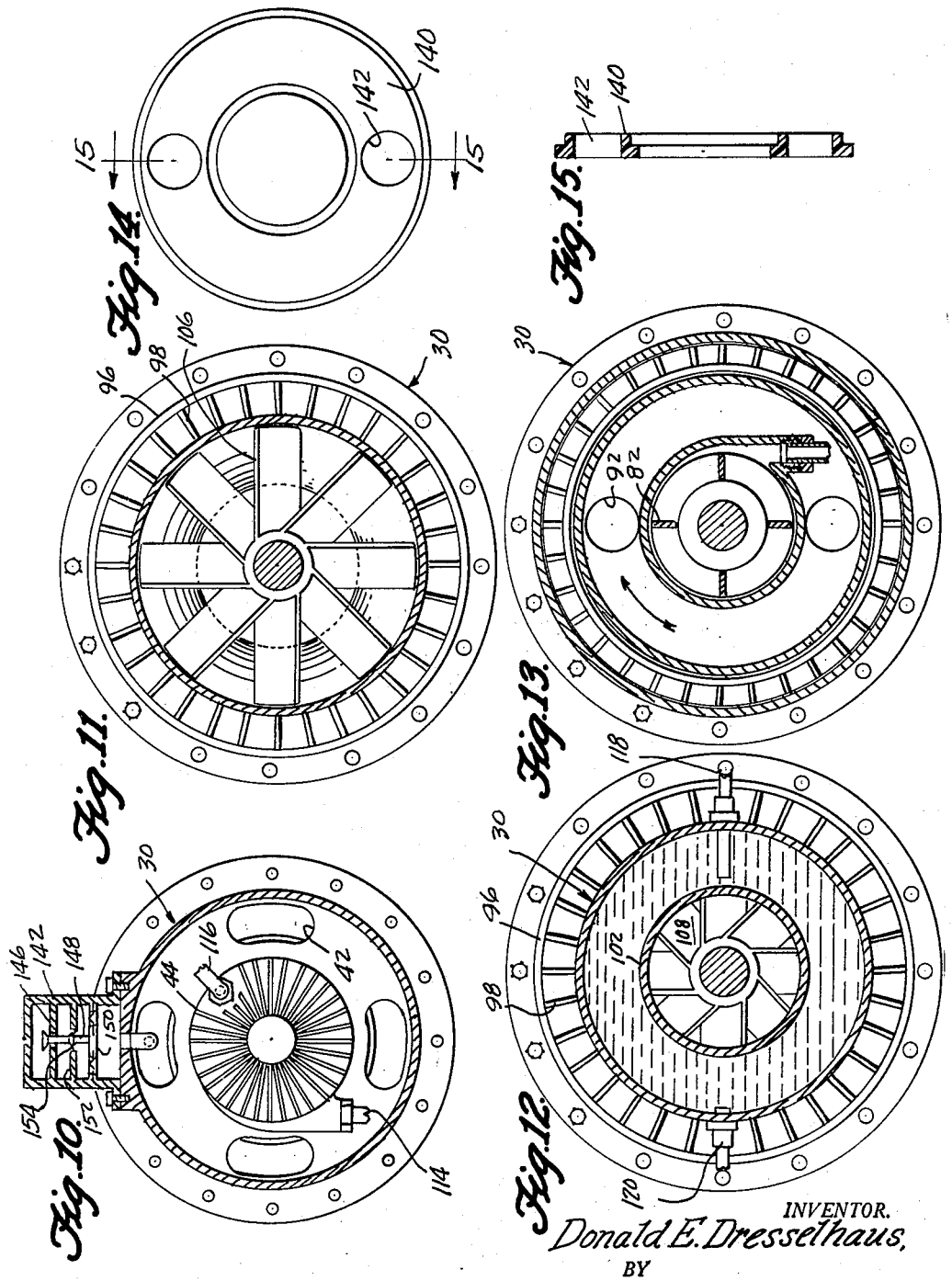
INVENTOR.
Donald E. Dresselhaus,
BY
McMorrow, Berman & Davidson
ATTORNEYS

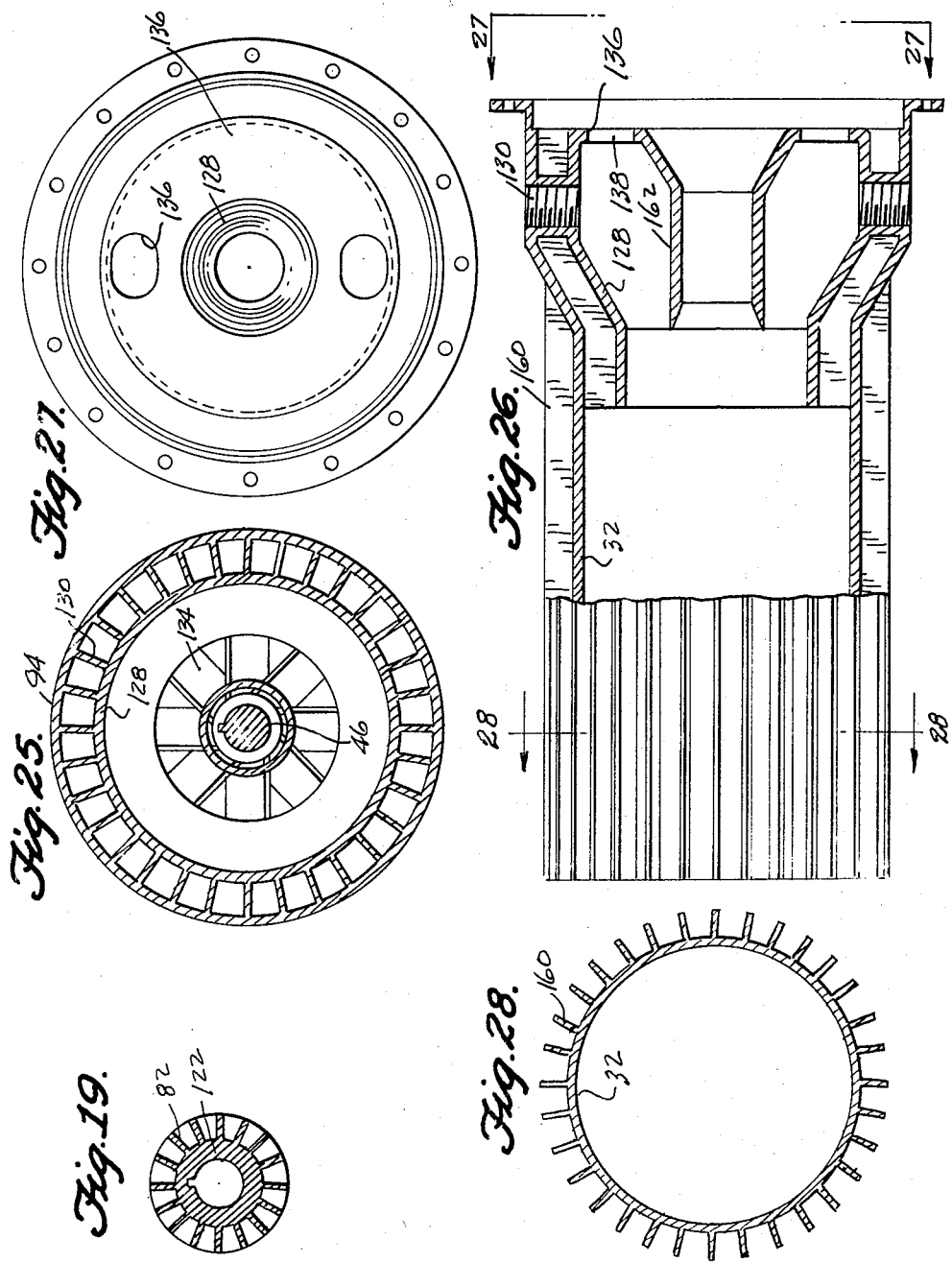

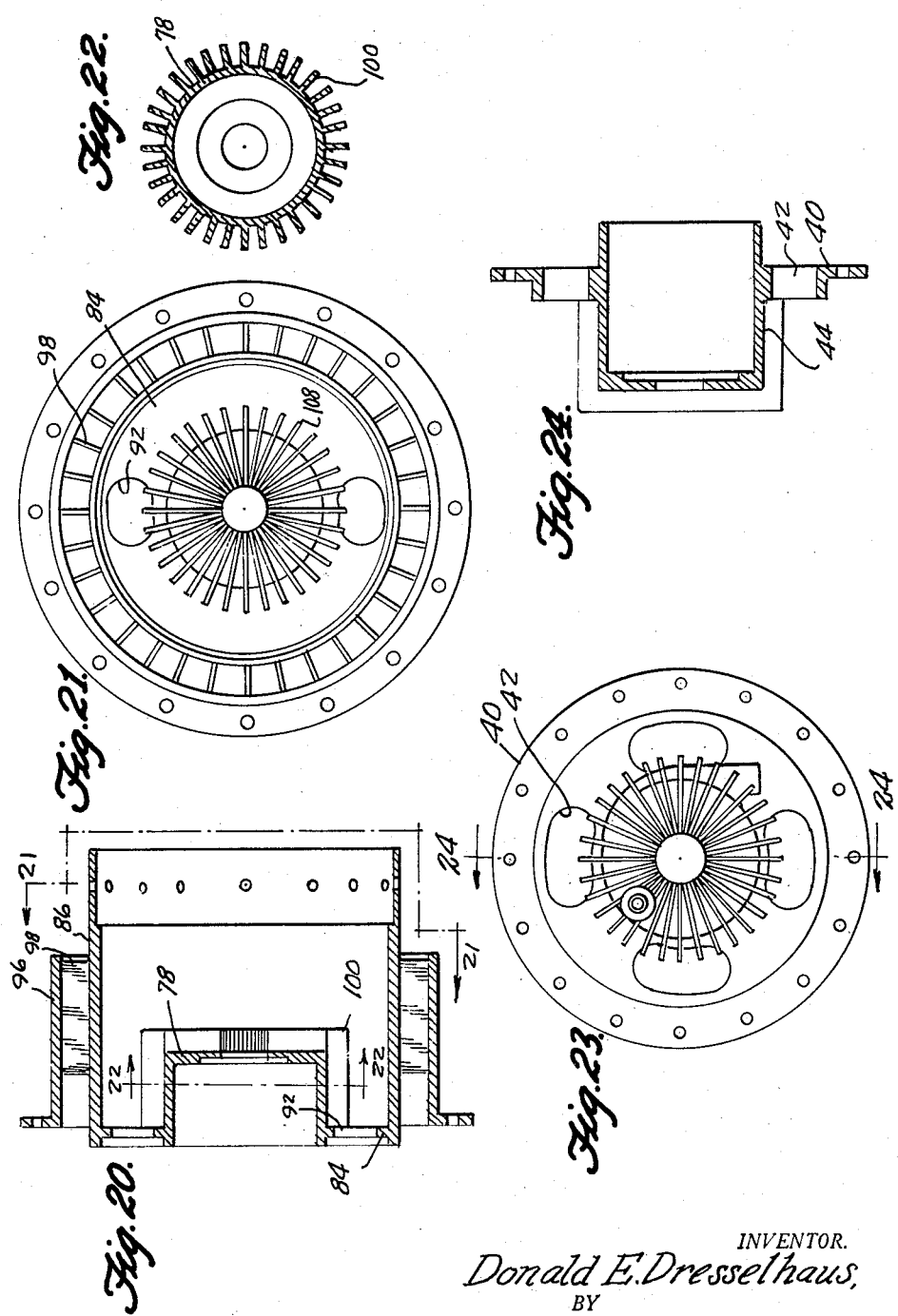

United States Patent Office 2,958,192
Patented Nov. 1, 1960

2,958,192

TURBINE JET ENGINE

Donald E. Dresselhaus, Dexter, Mo.
(1217 Southland Drive, Dotham, Ala.)

Filed Sept. 19, 1958, Ser. No. 762,180

4 Claims. (Cl. 60—39.36)

The present invention relates to a turbine jet engine.

An object of the present invention is to provide a turbine jet engine having a single rotating component with a minimum number of bearing supports for the rotating component, the supports being provided with positive cooling and lubrication means, and also provided with means for transferring the heat of the supports to a combustible fuel-air mixture.

Another object of the present inventon is to provide a turbine jet engine in which the portion of the fuel-air mixture that is fed to the jet nozzle in unburned condition and under pressure so as to provide added thrust to the engine.

A further object of the present invention is to provide a turbine jet engine in which the compressor operates in a chamber having a Venturi portion for applying a vacuum to the fuel supply conduit, thus ensuring positive fuel injection irrespective of atmospheric air pressure or gravitational forces.

A still further object of the present invention is to provide a turbine jet engine which has a high thrust-weight ratio, one which has means obviating the formation of ice in its air intake openings, one having few operating parts resulting in lessened drag on the aircraft in which it is installed, one which is sturdy in construction and simple in structure, and one which is economically feasible.

These and other objects and advantages of the present invention will be fully apparent from the following description when taken in conjunction with the annexed drawings, in which:

Figure 2 is an elevational view;

Figure 4 is a view taken on the line 4—4 of Figure 2;

Figure 5 is a side elevational view;

Figure 6 is a view, on an enlarged scale, taken on the line 6—6 of Figure 3;

Figure 7 is a view taken on the line 7—7 of Figure 6;

Figure 8 is a sectional view, similar to Figure 7, of a modified form of the ignition distributor;

Figure 9 is a view showing the distributor of Figure 8 rotated 180 degrees;

Figure 10 is a view taken on the line 10—10 of Figure 3;

Figure 11 is a view taken on the line 11—11 of Figure 3;

Figure 12 is a view taken on the line 12—12 of Figure 3;

Figure 13 is a view taken on the line 13—13 of Figure 3;

Figure 14 is an elevational view of an anti-sparking ring employed in the rotary valve structure of the engine of the present invention;

Figure 15 is a view taken on the line 15—15 of Figure 14;

Figure 16 is a side elevational view of the rotary valve;

Figure 17 is a front elevational view of the rotary valve;

Figure 18 is a view taken on the line 18—18 of Figure 17;

Figure 19 is a view taken on the line 19—19 of Figure 18;

Figure 20 is a view taken on the line 20—20 of Figure 2, with the valve housing portion of the engine aftersection detached from the combustion chamber portion of the housing;

Figure 21 is a view taken on the line 21—21 of Figure 20;

Figure 22 is a view taken on the line 22—22 of Figure 20;

Figure 23 is a view taken on the line 23—23 of Figure 3;

Figure 24 is a view taken on the line 24—24 of Figure 23;

Figure 25 is a view taken on the line 25—25 of Figure 3;

Figure 26 is a view, partially in section of the engine aftersection;

Figure 27 is a view taken on the line 27—27 of Figure 26; and

Figure 28 is a view taken on the line 28—28 of Figure 26.

Figure 1:
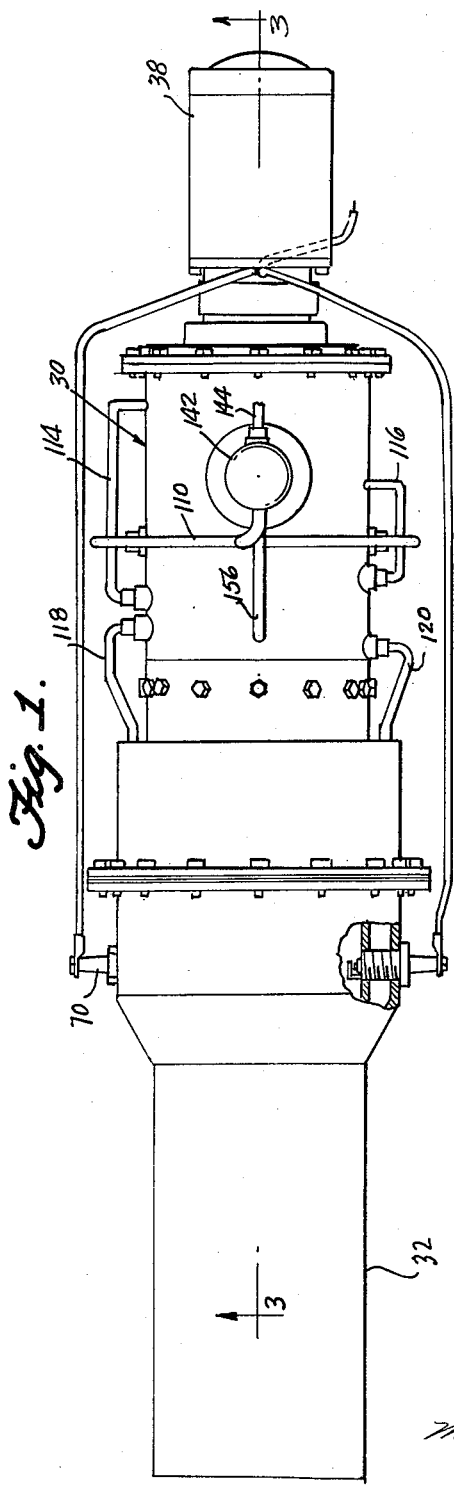
Figure 1 is a top plan view of the turbine engine according to the present invention.

Referring in greater detail to the drawings in which like numerals indicate like parts throughout the several views, in Figures 1 to 4, the turbine jet engine according to the present invention comprises an elongated housing designated generally by the reference numeral 30. The housing 30 has an aftersection including a constricted portion or exhaust nozzle 32 and a shell 34 surrounding the forward end portion of the aftersection of the housing 30 and enclosing a combustion chamber 36 provided in the rearward end of the housing 30. The forward end of the housing 30, Figure 4, has a compression chamber 124 provided with a constricted portion 125. A drive shaft 46 extends through the compression and combustion chambers 36 and 124. The compression chamber 124 is defined by the portion of the housing 30 between a rotor 106 carried by the drive shaft 46 and an annular plate 84 circumposed about the shaft 46 adjacent the combustion chamber 36 and bridging the housing 30. The constricted portion 125 of the compression chamber 124 is defined by the space between the rotor 106 and another rotor 104 also carried by the shaft 46 and a shell 102 having the wall inwardly bowed between its ends. Means or a nozzle 112 is provided in the constricted portion 125 of the compression chamber 124 for introducing fuel into such constricted portion. An openable and closable valve 122 is positioned between the combustion and compression chambers 36 and 124, and is connected to the shaft 46 for movement with the latter to control the flow of the air-fuel mixture from the compression chamber 124 into the combustion chamber 36. A starter-generator 38 of conventional construction is positioned centrally of a support plate 40 having a plurality inlet openings 42 for the admission of air into the interior of the housing 30. The support plate 40 is bolted to and bridges the forward open end of the housing 30.

A first bearing housing 44, Figures 2, 23 and 24, extends through and is fixedly supported in the support plate 40. The portion of the drive shaft 46 inwardly of and adjacent the forward end of the latter is rotatably supported in the bearing housing 44. An air inlet throttle disc 48 is positioned exteriorly of the plate 40 and has openings in registry with the inlet openings 42. The disc 48 is mounted upon the exterior face of the plate 40 for sliding movement therearound so that its openings 50 may be brought into and out of registry with the inlet openings 42.

Carried on a reduced forward end portion of the shaft 46 is an ignition distributor as shown in Figures 6 and 7. The reduced forward end portion of the shaft 46 is designated by the numeral 52 and carries thereon a transversely arranged insulation bar 54 having a wire 56 extending therethrough. Fixed contacts 58 and 60 are carried on supporting bars 62 and 64, respectively, which are fixedly secured on the interior wall of a sleeve 66 which extends into the bearing housing 44 through the open end of the latter and provides a support for the starter-generator 38. Wires 68 connect the one contact 60 with the spark plugs 70 (Figure 4) and another wire 72 connects the other contact 62 to a source of ignition current.

In Figures 8 and 9, a modified form of the ignition means is shown in which the arms of the bar 54' are staggered so as to conduct current from one contact to the other only once in one revolution of the associated drive shaft. In the form of the invention illustrated in Figures 6 and 7, the current is conducted from the contact 58 to the contact 60 twice during each revolution of the associated shaft 46.

A bearing assembly 74 is within the bearing housing 44 and supports the shaft 46 for rotation. A plurality of vanes, constituting an oil pump 76, are secured to the portion of the shaft 46 adjacent the bearing assembly 74 and work in the oil provided in the housing 44 for lubricating the bearing assembly 74.

A second bearing housing 78 is in axial alignment with the bearing housing 44 and is positioned within the housing 30 adjacent to the constricted portion or exhaust nozzle 33 and contains another bearing assembly 80 rotatably supporting the adjacent part of the shaft 46. Another oil pump 82 consisting in a plurality of vanes, is secured to the adjacent part of the shaft 46 immediately rearwardly of the bearing assembly 74 and works in the oil provided for the bearing assembly 74.

Figure 3:
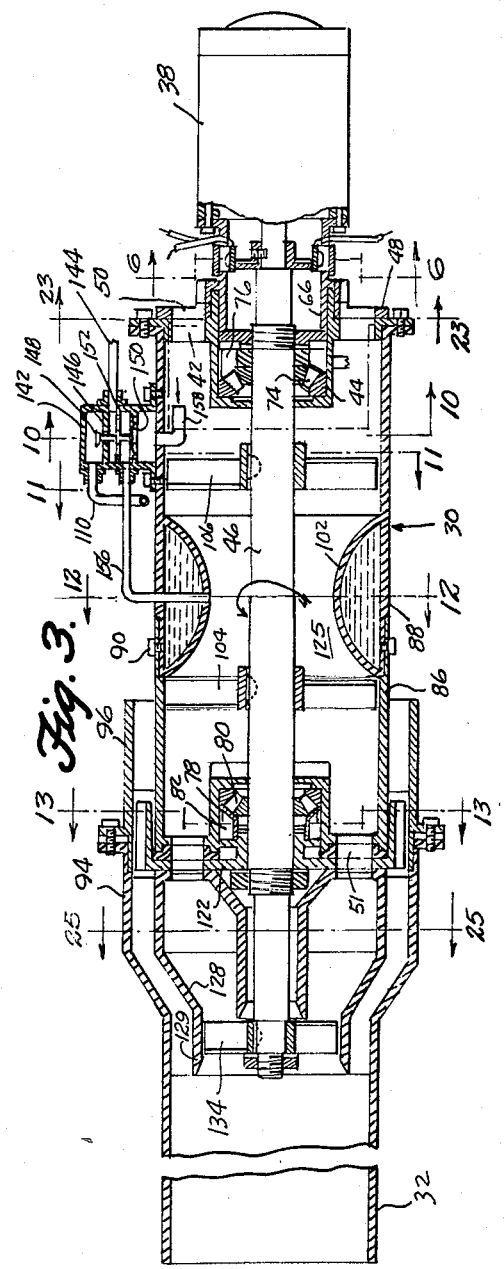
Figure 3 is a view taken on the line 3—3 of Figure 1, with part of the exhaust nozzle broken away.

The bearing housing 78 is fixedly supported upon the annular plate 84 which is formed integrally with the rear end of the rearward section 86 of the housing 30, the section 86 has its forward end portion receiving the rearward end portion of the forward section 88 of the housing 30, as shown most clearly in Figure 3. Bolts 90 secure the sections 86 and 88 together.

The annular plate 84 is provided with a series of spaced openings 92 for the passage of combustible air-fuel mixture therethrough. The shell 34 is formed in two sections 94 and 96 with the section 96 supported upon a plurality of fins 98 projecting rigidly from the housing section 86, other fins 100 projecting rigidly from the perimeter of the housing 78 and from the closed bottom of the housing 78.

Inwardly of the rearward end of the forward section 88 of the housing 30 is the inwardly bowed shell 102 providing with the adjacent portion of the housing section 88 an annular reservoir or cooling chamber for a body of oil. The interior of the shell 102 provides a Venturi or constricted passageway within the housing 30. Adjacent each end limit of the constricted passageway are the rotors 104 and 106, each drivingly carried by the shaft 46 and including a plurality of radially extending blades 108. The rotors 104 and 106 constitute sections of a compressor.

A combustion chamber 36 is defined by that part of the housing 30 between the annular plate 84, bearing housing 78, and the rearward end of the housing 30 or tail cone 138. The compression chamber 124 is defined by that part of the housing 30 between the annular plate 84, bearing housing 78, and the support plate 48 and bearing housing 44, the constricted portion 125 being defined by the space between the rotors 106 and 104, and shell 102.

Means is provided for introducing fuel into the constricted portion 125 of the compression chamber 124 and such means includes fuel conduits 110 having nozzles 112 at their free ends. Conduits 110 are connected to a fuel flow control means to be described later.

Other conduits 114 and 116 connect the inlet and outlet of the oil pump 76 with the cooling reservoir provided by the shell 102 and conduits 118 and 120 connect the inlet and outlet of the pump 82 to the reservoir for cooling oil.

The openable and closable valve 122 is in a passageway 51 provided between the compression chamber 124 and the combustion chamber 36 and embodies a disc circumposed about the bearing housing 78 adjacent the annular plate 84 and is connected to the drive shaft 46 for rotation therewith, the disc valve 122 carrying on its perimeter a plurality of spaced compressor blades 126. The blades 126 rotate in the space between the shell 34 and the adjacent part of the rearward housing section 86.

Means is provided for confining the combustible fuel-air mixture in the combination chamber 36 and also for shielding the shell section 94 from the heat of the combustion chamber when the fuel-air mixture is ignited. This means includes a tail cone 128 which projects rearwardly from the free end of the housing section 86 and is supported within the section 94 by means of fins 130. The spark plugs 70 extend through both the section 94 and the cone 128 so that their firing points are within the compression chamber 36.

The openable and closable valve 122 is provided with a plurality of spaced openings 132, as shown most clearly in Figures 17 and 18. Upon rotation of the shaft 46, the valve 122 rotates and is cyclically opened and closed in timed harmony with the firing of the spark plugs 70.

The rearward end of the tail cone 128 has a constricted portion 129 providing a means for exhausting combustion effluent from the combustion chamber 36. A turbine 134 is fixedly secured to and drivingly connected to the portion of the shaft 46 which projects into the constricted portion 125 of the tail cone 128. The turbine 134 is driven by the impingement of the combustion effluent in the combustion chamber 36.

The forward portion of the cone 128 is formed into an annular plate 136 having openings 138 therein, as shown most clearly in Figures 26 and 27.

Means is provided against the transfer of heat from the combustion chamber 36 to the compression chamber 124 in the area of the valve openings 132. Such means consists in a disc shown in Figures 14 and 15 and designated by the numeral 140. The disc 140 is provided with openings 142 which are in registry with the openings 92 and openings 138 in the rearward portion of the housing section 86 and plate 136, respectively. The disc is preferably fabricated of a material which does not transfer heat readily and also of a material which will not spark when struck by a metallic implement. The disc 140 is positioned immediately forwardly of the rotary valve 122 and separates the valve 122 from the adjacent part of the housing section 86. Should the support of the valve 122 wear so that the valve 122 strikes the disc 140, no sparks will be generated to set off an explosion on the forward side of the valve 122.

The present invention provides a fuel float control means in a housing 142 positioned exteriorly of the housing 30. This means is shown most clearly in Figures 2, 3, and 10. The housing 142 has an inlet conduit 144 for connection to a source of fuel under pressure. A fixed partition 146 extends across the interior of the housing 142 at a point spaced inwardly of the closed upper end of the housing 142. The partition 146 has an opening therethrough providing a valve seat for a valve 148 which has its stem end anchored on a flexible partition or diaphragm 150, which is secured by its perimeter to the wall of the housing 142. Another partition 152 has its perimeter secured to the inner wall of the housing 142 at a space from the partition 146. A smaller diaphragm 154 is carried by the partition 152 and supports the valve 148 for opening and closing movements with respect to the opening provided in the partition 146. The inlet conduit 144 is connected in communication with the space immediately below the partition 146 and the conduits 110 are connected in communication with the space above the partition 146.

A vacuum line 156 has one end connected in communication with the constricted passageway portion of the compression chamber 124. The other end of the conduit 156 is connected in communication with the space between the diaphragm 150 and the partition 152, as shown most clearly in Figure 3. Another conduit 158 has one end open and facing toward the inlet opening 42 in the end of the housing 30 and has its other end extending through the wall of the housing 30 into the space between the exterior face of the housing 30 within the housing 142 in the space bounded by the housing 142 and the underface of the diaphragm 150.

The action of the fuel flow control means is responsive to the vacuum within the constricted portion of the combustion chamber 124, which vacuum draws the diaphragm 150 toward the partition 152 and effects the opening of the valve 148 to thereby permit fuel to flow from the inlet conduit 144 to the dispensing conduits 110 and outwardly through the nozzles 112 into the combustion chamber. Ram air is also admitted through the conduit 158 into the space in the housing 142 below the diaphragm 150.

In operation, the starter generator 38 is employed to impart initial rotation to the shaft 46. The compressors provided by the blades 108 on the rotors 104 and 106 draw in the air through the openings 42 and 50 and force the air rearwardly through the passageway 51 provided between the combustion chamber 36 aand compression chamber 124. Fuel is then admitted into the constricted portion of the compression chamber 124 through the nozzles 112 and is mixed with the air. This fuel air mixture is forced into the combustion chamber 36 and is cyclically ignited by the spark plug 70. The timing of the firing of the spark plug 70 is such that the shaft 46 rotates the valve 148 to closed position just prior to firing of the spark plug 70. The closed position of the valve 122 results from the rotary movement of the valve 122 from the position in which the openings 132 are in registry with the openings 92 and 138 to positions in which the openings 132 are out of registry with such openings. The combustion effluent produced by the exploding air-fuel mixture impinges upon the blades of the turbine 134 and effects the rotation of the shaft 46 to drive the rotors 104 and 106 and the associated oil pumps 76 and 82.

An important feature of the present invention is the provision of the oil cooling chamber formed by the shell 102 and the inner wall of the housing 30. The circulation of the body of lubricating oil through the pumps 76 and 82 into the cooling chamber provides a means of cooling the bearing lubricating oil and also imparting heat to the shell 102 which heat is transferred to the interior of the combustion chamber. The positioning of the inlet and outlet pipes or conduits of the oil cooling system is such that a positive circulation of the lubricating oil in the cooling chamber is assured.

In Figures 26 and 28, the jet nozzle 32 is provided with fins 160 on its exterior surface. These fins 160, and also the fins 45 on the rearward end portion of the bearing housing 44 and on the forward end portion of the bearing housing 78 may be omitted if desired. The tail cone 128 is preferably constructed with a sleeve 162 circumposed about the adjacent portion of the shaft 46 and forms a shield for the latter.

An important feature of the present invention is the provision of the blades 126 on the periphery of the rotary valve 122. The blades 126 constitute a compressor operating in the space between the shell 34 and the adjacent portion of the section 86 of the housing 30. The blades 126 are disposed within the last-named space and are connected to the disc valve 122 for rotation therewith for applying cooling air to the exhaust gases emerging from the turbine 134. The blades 126 also serve to direct to the jet nozzle 32 any unburned air-fuel mixture which might leak from the periphery of the valve 122. This leakage is possible as it is intended that the valve 122 revolves with the shaft 46 with a minimum of friction. The unburned air-fuel mixture traveling through the space between the shell 34 and the housing 30 is ignited by the combustion effluent passing through the turbine 134 and has an after burner effect adding thrust to the engine of the present invention.

What is claimed is:

1. In a turbine jet engine, an elongated housing having a forward end and a rearward end, said housing having a constricted portion inwardly of and adjacent the rearward end, a support plate bridging the forward end of said housing, a first bearing housing extending through and fixedly supported in said support plate, there being a plurality of inlet openings for the admission of air in the portion of said plate surrounding said bearing housing, a second bearing housing positioned within said housing adjacent to said constricted portion thereof and fixedly supported in said housing, said second bearing housing being in axial alignment with said first bearing housing, an annular plate surrounding and supporting said second bearing housing and fixedly secured to said elongated housing, said annular plate having a plurality of openings therein, a drive shaft extending through and rotatably supported in said first and second bearing housings and having one end projecting forwardly of the support plate and having the other end in the constricted portion of said elongated housing, a disc valve circumposed about said second bearing housing adjacent said annular plate and connected to said drive shaft for rotation therewith, said disc valve being provided with openings registrable with the openings in said annular plate upon rotation of said drive shaft, the part of said elongated housing between said annular plate and said bearing housing and said support plate and said first bearing housing being a compression chamber and the part of said elongated housing between said annular plate and said bearing housing and the rearward end of said elongated housing being a combustion chamber, a compressor in the compression chamber and drivingly connected to said drive shaft, means for introducing and admixing with air a fuel in said compression chamber, and means for igniting the fuel and air mixture in said combustion chamber.

2. In a turbine jet engine, an elongated housing having a forward end and a rearward end, said housing having a constricted portion inwardly of and adjacent the rearward end, a support plate bridging the forward end of said housing, a first bearing housing extending through and fixedly supported in said support plate, there being a plurality of inlet openings for the admission of air in the portion of said plate surrounding said bearing housing, a throttle disc exteriorly of said support plate and mounted on said plate for sliding movement therearound, said disc being provided with a plurality of openings registrable with the inlet openings of said support plate upon sliding movement of said disc, a second bearing housing positioned within said housing adjacent to said constricted portion thereof and fixedly supported in said housing, said second bearing housing being in axial alignment with said first bearing housing, an annular plate surrounding and supporting said second bearing housing and fixedly secured to said elongated housing, said annular plate having a plurality of openings therein, a drive shaft extending through and rotatably supported in said first and second bearing housings and having one end projecting forwardly of the support plate and having the other end in the constricted portion of said elongated housing, a turbine within the constricted portion of said elongated housing and drivingly connected to said drive shaft, a disc valve circumposed about said bearing housing adjacent said annular plate and connected to said drive shaft for rotation therewith, said disc valve being provided with openings registrable with the openings in said annular plate upon rotation of said drive shaft, the part of said elongated housing between said annular plate and second bearing housing and said support plate and first bearing housing being a compression chamber and the part of said elongated housing between said annular plate and said bearing housing and the rearward end of said elongated housing being a combustion chamber, a compressor in the compression chamber and drivingly connected to said drive shaft, means for introducing and admixing with air a fuel in said compression chamber, and means for igniting the fuel and air mixture in said combustion chamber.

3. In a turbine jet engine, an elongated housing having a forward end and a rearward end, said housing having a constricted portion inwardly of and adjacent the rearward end, a support plate bridging the forward end of said housing, a first bearing housing extending through and fixedly supported in said support plate, there being a plurality of inlet openings for the admission of air in the portion of said plate surrounding said bearing housing, a throttle disc exteriorly of said support plate and mounted on said plate for sliding movement therearound, said disc being provided with a plurality of openings registrable with the inlet openings of said support plate upon sliding movement of said disc, a second bearing housing positioned within said housing adjacent to said constricted portion thereof and fixedly supported in said housing, said second bearing housing being in axial alignment with said first bearing housing, an annular plate surrounding and supporting said second bearing housing and fixedly secured to said elongated housing, said annular plate having a plurality of openings therein, a drive shaft extending through and rotatably supported in said first and second bearing housings and having one end projecting forwardly of the support plate and having the other end in the constricted portion of said elongated housing, a turbine within the constricted portion of said elongated housing and drivingly connected to said drive shaft, a disc valve circumposed about said second bearing housing adjacent said annular plate and connected to said drive shaft for rotation therewith, said disc valve being provided with openings registrable with the openings in said annular plate upon rotation of said drive shaft, the part of said elongated housing between said annular plate and second bearing housing and said support plate and said first bearing housing being a compression chamber and the part of said elongated housing between said annular plate and second bearing housing and the rearward end of said elongated housing being a combustion chamber, a shell circumposed about the part of said elongated housing including the constricted portion and the said annular plate and disc valve and spaced from and fixedly supported on said elongated housing, said shell having one end inwardly of said disc valve and forming with the adjacent portion of said elongated housing an inlet for auxiliary air, a bladed compressor disposed within the space between said shell and the adjacent portion of said elongated housing and connected to said disc valve for rotation therewith for applying cooling air to the exhaust gases emerging from said turbine.

4. In a turbine jet engine, an elongated housing having a forward end and a rearward end, said housing having a constricted portion inwardly of and adjacent the rearward end, a support plate bridging the forward end of said housing, a first bearing housing extending through and fixedly supported in said support plate, there being a plurality of inlet openings for the admission of air in the portion of said plate surrounding said bearing housing, a throttle disc exteriorly of said support plate and mounted on said plate for sliding movement therearound, said disc being provided with a plurality of openings registrable with the inlet openings of said support plate upon sliding movement of said disc, a second bearing housing positioned within said housing adjacent to said constricted portion thereof and fixedly supported in said housing, said second bearing housing being in axial alignment with said first bearing housing, an annular plate surrounding and supporting said second bearing housing and fixedly secured to said elongated housing, said annular plate having a plurality of openings therein, a drive shaft extending through and rotatably supported in said first and second bearing housings and having one end projecting forwardly of the support plate and having the other end in the constricted portion of said elongated housing, a turbine within the constricted portion of said elongated housing and drivingly connected to said drive shaft, a disc valve circumposed about said bearing housing adjacent said annular plate and connected to said drive shaft for rotation therewith, said disc valve being provided with openings registrable with the openings in said annular plate upon rotation of said drive shaft, the part of said elongated housing between said annular plate and second bearing housing and support plate and first bearing housing being a compression chamber and the part of said elongated housing between said annular plate and said bearing housing and the rearward end of said elongated housing being a combustion chamber, said compression chamber having a constricted portion, a pair of spaced compressors defining the end limits of said compression chamber constricted portion and each connected to said drive shaft for rotation with the latter, a nozzle in said compression chamber constricted portion for introducing fuel and admixing same with air, and means for igniting the fuel and air mixture in said combustion chamber.

References Cited in the file of this patent

UNITED STATES PATENTS

| | | |
|---|---|---|
| 1,273,466 | Doble | July 23, 1918 |
| 2,110,422 | Norguet | Mar. 8, 1938 |
| 2,404,767 | Heppner | July 23, 1946 |
| 2,490,623 | Elsby | Dec. 6, 1949 |
| 2,587,649 | Pope | Mar. 4, 1952 |
| 2,630,678 | Pratt | Mar. 10, 1953 |
| 2,640,314 | Abel | June 2, 1953 |
| 2,732,999 | Stalker | Jan. 31, 1956 |
| 2,761,280 | Atkinson | Sept. 4, 1956 |
| 2,850,229 | Stalker | Sept. 2, 1958 |

FOREIGN PATENTS

| | | |
|---|---|---|
| 589,639 | Great Britain | June 25, 1947 |
| 624,222 | Great Britain | May 31, 1949 |